United States Patent
Odone

[11] 3,743,396
[45] July 3, 1973

[54] CONTINUOUS FILM MOVEMENT MOTION PICTURE APPARATUS

[75] Inventor: Giovanni Odone, La Rosiaz S/Lausanne, Switzerland

[73] Assignee: Bolex International S.A., Sainte-Croix (Vaud), Switzerland

[22] Filed: July 20, 1971

[21] Appl. No.: 164,305

[30] Foreign Application Priority Data
July 30, 1970 Switzerland............... 11505/70

[52] U.S. Cl..................... 352/109, 352/200
[51] Int. Cl............................ G03b 41/10
[58] Field of Search................ 352/105, 106, 107, 352/108, 109, 200

[56] References Cited
UNITED STATES PATENTS
3,544,207  12/1970  John ................. 352/109

FOREIGN PATENTS OR APPLICATIONS
478,460    1/1938   Great Britain ........... 352/200
1,157,918  11/1963  Germany ................ 352/200

Primary Examiner—Samuel S. Matthews
Assistant Examiner—Monroe H. Hayes
Attorney—Emory L. Groff et al.

[57] ABSTRACT

The device includes a light source supplying several flashes on the passage of each frame of the film. A mirror provides several optical paths for the light rays to compensate for the movements of the film between flashes, and is actuated independently of the advance of the film and at a frequency several times higher than the rate of passage of the images. A detector of the relative momentary position between the compensating mirror and the position of the film activates a flash of the lamp for the positions in which the compensation is correct by way of an electrical gating circuit.

12 Claims, 4 Drawing Figures

PATENTED JUL 3 1973          3,743,396
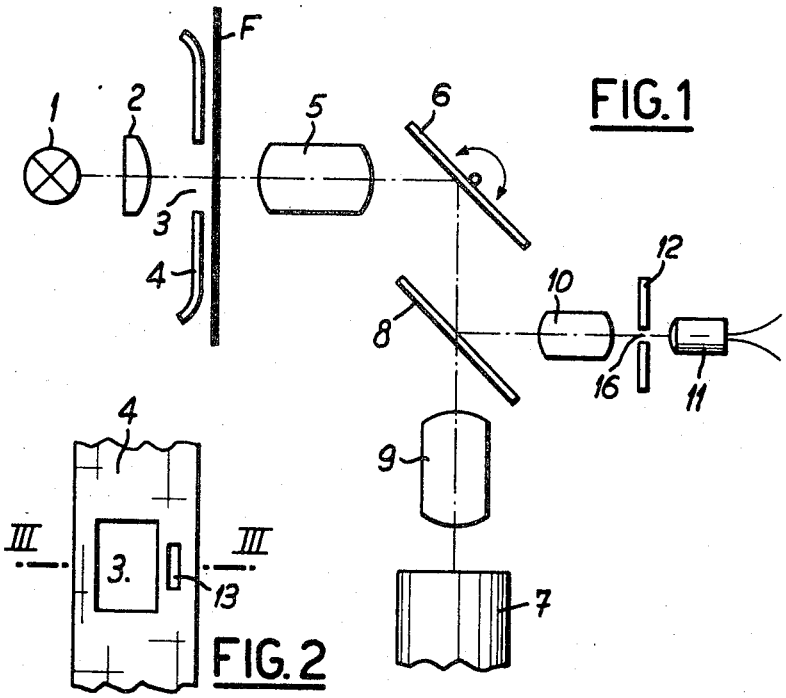
FIG.1
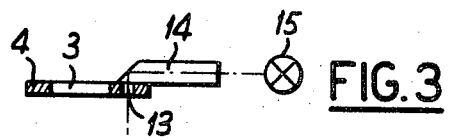
FIG.2
FIG.3
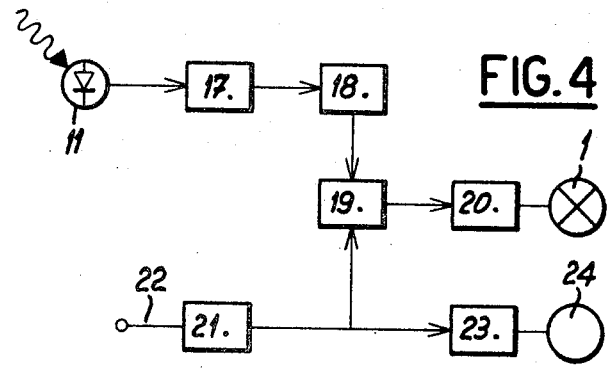
FIG.4
INVENTOR
GIOVANNI ODONE
BY  Emery L. Groff Jr.
ATTORNEY

CONTINUOUS FILM MOVEMENT MOTION PICTURE APPARATUS

The present invention relates to the taking of pictures or the reproduction of cinematographic images during the movement of the film.

It is known, principally in the case of the reproduction of cinematographic images, to provide an optical system such as a rotary prism or an oscillating mirror to compensate for the movement of the film and to enable the projection or the observation of a stable image in spite of the movement of this image with the film. In this case, the compensation of the movement of the image must be very precise, which is realizable without long periods of obturation between the projection of one image and that of the following one, only with difficulty.

It has also been proposed to obtain stability of the projected image by effecting projection by means of a discharge lamp supplying, for example, one flash for each image. This solution is acceptable in the case of viewers, but cannot be used for projection, since it leads to unacceptable flickering.

To avoid this flickering, it has been proposed to use a lamp supplying at least two flashes for each image, the projection apparatus then requiring compensating means for the movement of the image (German Pat. No. 1,804,273). In this solution, the flashes are triggered by the optical device compensating for the movement of the image.

It is an object of the present invention to provide a device enabling projection of cinematographic images without flickering and whose luminosity is independent of the rate of procession of the images of the film, the progress of the film being able to be continuous.

According to the invention there is provided a device for the taking of views for the reproduction of cinematographic images in the course of the displacement of the film, comprising a light source supplying several flashes on the passage of each image of the film, means being provided to enable several optical paths for the light rays to compensate for the movements of the film between the said flashes, characterized in that the compensating means for the displacements of the film are actuated in a manner independent of the advance of the film and at a frequency several times higher than the rate of passage of the images, a detector of the relative momentary position between the compensating means and the position of the film actuating a flash of the lamp for the positions in which the compensation is correct.

The accompanying drawings show, diagrammatically and by way of example, one embodiment of the device according to the invention, given purely by way of non-limiting illustration. In said drawings:

FIG. 1 is a general diagram of said embodiment of the device;

FIGS. 2 and 3 illustrate a detail of the embodiment of FIG. 1; and

FIG. 4 is a block diagram of an electrical control device for the flashes of the lamp.

With reference to FIG. 1, a discharge lamp 1 is placed behind a condenser 2 intended to concentrate the light rays on a projection window 3 provided in a film passage element 4. The film F to be projected is driven in continuous manner by means, not shown, and passes in front of the window 3.

The light rays are received by an objective lens 5 which sends them on in the direction of an oscillating mirror 6 intended to reflect these rays to form an image on the screen of a tube 7 enabling the transformation of a luminous image into a video electrical signal.

Between the mirror 6 and the tube 7, the rays pass through a semi-transparent mirror 8 and an objective 9. The semi-transparent mirror reflects a part of the rays towards an objective 10 intended to form through a mask 12, an image of the perforation of the film on a photoelectric cell 11.

FIG. 2 is a view of the passage element 4 and shows the window 3 for the frame or image of the film, as well as an aperture 13 in front of which the perforations of the film pass.

FIG. 3 is a cross-section of the passage element 4 and shows a prism 14 receiving the rays from a permanently lit lamp 15. This prism directs the rays from this lamp towards the aperture 13.

The height of the aperture 13 is substantially equal to the distance between two consecutive perforations of the film, so that during the movement of the film, this window always contains only a single perforation. As a result of the oscillating movement of the mirror 6, of which the frequency is of the order of 200 cycles, the image of the perforation visible in the window 13 effects a to-and-fro movement on the mask 12. Each time that this image arrives opposite an opening 16 of the mask 12, it energizes the photoelectric cell 11.

It is clear that in a cinematographic film, the image of the film occupies a well-determined position with respect to a neighboring perforation, this relative position between the image and the perforation being the same for all images of the film. Thus, each time that the image of a perforation corresponds with the opening 16 of the mask 12, the cinematographic image occupies a well-determined position with respect to the screen of the tube 7. It then suffices to trigger a flash of the discharge lamp 1 to obtain on the screen of the tube 7 a succession of projected images stable in position.

Since the mirror 6 is actuated by an oscillating movement, it occurs on each forward movement and on each return movement once in a position ensuring the projection of the perforation onto the aperture 16. However, these different positions, for which the compensation of the movement of the image is obtained, are not always equally spaced in time. However, the images projected on the tube 7 corresponding to the two directions of movement of the mirror 6 do not overlap, since the discharge lamp 1 is actuated, for a to-and-fro movement of the mirror 6, by one and the other edge of the perforation. To avoid this drawback, a flash is only produced on movements of the mirror 6 in a predetermined direction, preferably in that which over compensates for the movement of the film. The elimination of the flash during the return movement of the mirror 6 can easily be obtained by means of the electrical circuit illustrated in FIG. 4.

According to this circuit, the photoelectric cell 11 is constituted by a photodiode controlling an amplifier 17, which supplies the input signal to a pulse generator 18. This generator 18 operates a logic circuit 19 constituted by an AND gate, of which the output acts on a switching device 20 for the discharge lamp 1.

The circuit of FIG. 4 also comprises an oscillator 21 having an input line 22 to introduce a synchronizing signal derived from the mains. This oscillator gives an alternating voltage whose frequency is, for example, 200 cycles, this voltage being amplified by an amplifier 23 to drive a motor 24 for actuating the mirror 6. The output voltage of the oscillator 21 is also applied to the gate circuit 19, so that the pulses from the generator 18 can pass this gate circuit for a predetermined polarity of the voltage of the oscillator 21 and are blocked for the other polarity.

It will be understood, of course, that various modifications may be provided. In particular, the oscillating mirror 6 could be replaced by a rotary mirror, for example with facets, so that there would no longer be a return movement of the mirror and the logic circuit 19 of FIG. 4 could hence be eliminated. It is clear that the semi-reflecting mirror 8 could be replaced by a small mirror arranged so as to detect only the rays of the image of the perforation and situated outside the path of the rays corresponding to the cinematographed subject.

The device according to the invention could also be provided in the case of taking pictures in artificial light, the lamp 1 then being a lamp intended for the illumination of the subject to be cinematographed. Such a device could be especially advantageous in the case of taking photographs at very high speed for the purpose of obtaining very slow-motion pictures.

It is to be understood that all such modifications and changes are to be regarded as within the scope of the invention as defined by the appended claims.

I claim:

1. Device for the taking of views or the reproduction of cinematographic images on cinematographic film in the course of the movement of the film, comprising a light source supplying a plurality of flashes on the passage of each frame of the film, and a steady light source for supplying a continuous light ray, a film passage element with two apertures, one aperture being a projection aperture for passing the light flashes onto the film, and another aperture for the continuous light ray to pass through the perforations of the film to produce interrupted light rays when the film is moving, a deflecting mirror, a motor for actuating the mirror at a frequency several times higher than the rate of passage of the frame of the film, a mask provided with an aperture, said mask being in the path of the light ray from the deflecting mirror and receiving across its face several sweeps of the interrupted light ray during the passage of a film frame across the projection aperture of the film passage element, a detector for receiving that portion of the interrupted light ray that passes through the aperture in said mask, a switching device for the flashing light source, and a circuit actuated by said detector to switch on the flashing light source several times during the passage of each frame of the continuously moving film.

2. The device according to claim 1 wherein, for the purpose of taking views, the film is a photosensitive film, and the light source supplying a plurality of flashes is directed to the subject being viewed to provide a plurality of light images passing through the projection aperture of the film passage element onto the photosensitive film.

3. The device according to claim 1 wherein, for the purpose of reproduction of cinematographic images, a viewing screen is provided onto which the images from the film are projected.

4. The device according to claim 1 wherein, for the purpose of enabling the transformation of the film images into video electrical signals, said deflecting mirror is sufficiently large to receive the film images from the film through the projection aperture, and a tube with a photosensitive screen is provided to receive the film images reflected from the oscillating mirror and transforming them into video electrical signals.

5. The device according to claim 4 wherein, a rotary mirror provided with facets is provided to reflect the film images onto the photosensitive screen of the tube.

6. Moving picture apparatus for a continuously moving film comprising a film passage element having a window in front of which passes a film, a light source producing several flashes during the passage of each frame of the film, an objective lens, deflecting means for the light rays passing through the objective lens, control means for the release of each flash of the light source comprising light projection means of the image of each perforation reaching said deflecting means, said deflecting means being operated at a frequency different from that of the advance of the film, this frequency being many times higher than the rate of passage of the frames of the film in front of the window, said control means of the flashes of the light source comprising a photoelectric detector sensitive to the passage of the image of a perforation when in a predetermined position.

7. Moving picture apparatus according to claim 9 wherein, for the purpose of taking views, the continuously moving film is a photosensitive film and the light source producing several flashes is directed to the subject being viewed in order to provide a plurality of light images through the objective lens onto the photosensitive film.

8. Moving picture apparatus according to claim 6 wherein, for the purpose of reproduction of the images on the continuously moving film, a viewing screen is provided in line with the objective lens to reproduce the images on the film.

9. Moving picture apparatus according to claim 6 wherein, for the purpose of enabling the transformation of the images on the film into video electrical signals, said deflecting means is sufficiently large to receive the film images through the objective lens and directing them to a tube with a photosensitive screen and transforming them into video electrical signals.

10. Moving picture apparatus according to claim 6 wherein, the deflecting means for the light rays passing through the objective lens is an oscillating mirror.

11. Moving picture apparatus according to claim 6 wherein, the deflecting means for the light rays passing through the objective lens is a rotary mirror with facets.

12. In an apparatus for the timing of light flashes on a continuously moving picture film, said film having image frames and marginal perforations, the arrangement comprising two light sources: a first light source for producing flashes of light directed to the frames of the film, and a second light source for producing a steady light directed to the marginal perforations of the film, said first light source producing several flashes for each passage of a frame of the film, said second light source producing a series of light beams when interrupted by the motion of the film perforations, a photoelectric device for sensing the interrupted beams of the second light source, an electronic circuit comprising a switching device for energizing the first light source, said photoelectric device producing sensing pulses to actuate the switching device to produce several flashes from the first light source at predetermined positions of the frame of the film.

* * * * *